United States Patent
Kondo et al.

(10) Patent No.: US 7,068,863 B2
(45) Date of Patent: Jun. 27, 2006

(54) OPTICAL WAVEGUIDE DEVICE, AN OPTICAL MODULATOR, A MOUNTING STRUCTURE FOR AN OPTICAL WAVEGUIDE DEVICE AND A SUPPORTING MEMBER FOR AN OPTICAL WAVEGUIDE SUBSTRATE

(75) Inventors: Jungo Kondo, Nishikamo-Gun (JP); Atsuo Kondo, Okazaki (JP); Kenji Aoki, Ogaki (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 145 days.

(21) Appl. No.: 10/233,929

(22) Filed: Sep. 3, 2002

(65) Prior Publication Data

US 2003/0044100 A1 Mar. 6, 2003

(30) Foreign Application Priority Data

Sep. 5, 2001 (JP) ........................... P2001-268680
Jul. 29, 2002 (JP) ........................... P2002-219090

(51) Int. Cl.
*G02F 1/35* (2006.01)
*G02F 1/295* (2006.01)
*G02B 6/10* (2006.01)

(52) U.S. Cl. .............................. 385/2; 385/4; 385/131
(58) Field of Classification Search ................ 385/1–5, 385/8, 131; 359/245, 322, 237
See application file for complete search history.

(56) References Cited

U.S. PATENT DOCUMENTS

| | | | | |
|---|---|---|---|---|
| 4,778,235 A * | 10/1988 | Fujiwara | ........................ | 385/8 |
| 4,801,184 A * | 1/1989 | Revelli | ........................ | 385/8 |
| 5,153,930 A * | 10/1992 | DuPuy et al. | .................... | 385/8 |
| 5,185,823 A * | 2/1993 | Kaku et al. | ...................... | 385/2 |
| 5,313,535 A * | 5/1994 | Williams | ...................... | 385/14 |
| 5,502,780 A * | 3/1996 | Rangaraj | ........................ | 385/3 |
| 5,530,777 A | 6/1996 | Enokihara et al. | | |
| 5,991,491 A | 11/1999 | Madabhushi | | |
| 6,219,469 B1 | 4/2001 | Minakata et al. | ............... | 385/2 |
| 6,571,026 B1 * | 5/2003 | Kondo et al. | ................... | 385/2 |
| 6,599,757 B1 * | 7/2003 | Murai | ............................ | 438/3 |
| 6,950,580 B1 * | 9/2005 | Mitomi et al. | ................. | 385/40 |

FOREIGN PATENT DOCUMENTS

| | | |
|---|---|---|
| JP | 09-211402 A1 | 8/1987 |
| JP | 5-241115 A | 9/1993 |
| JP | 06-051254 A1 | 2/1994 |
| JP | 09-251146 A1 | 9/1997 |
| JP | 10-133159 A | 5/1998 |

OTHER PUBLICATIONS

U.S. Appl. No. 10/108,250, filed Mar. 27, 2002, Kenji Aoki et al.

* cited by examiner

*Primary Examiner*—Joseph Williams
*Assistant Examiner*—Peter Macchiarolo
(74) *Attorney, Agent, or Firm*—Burr & Brown

(57) ABSTRACT

An optical waveguide device has an optical waveguide substrate and a supporting body for supporting the substrate. The substrate has a main body made of an electro-optic material and having a main face and an opposing face, optical waveguides, and electrodes for applying an electrical signal on the optical waveguides. At least a part of the opposing face of the supporting body opposing the substrate is covered with a conductive layer. It is thus possible to reduce the resonance due to substrate radiation leakage of the microwave signal into the whole of the optical waveguide substrate and supporting body.

36 Claims, 16 Drawing Sheets

OPTICAL WAVEGUIDE DEVICE, AN OPTICAL MODULATOR, A MOUNTING STRUCTURE FOR AN OPTICAL WAVEGUIDE DEVICE AND A SUPPORTING MEMBER FOR AN OPTICAL WAVEGUIDE SUBSTRATE

This application claims the benefit of Japanese Patent Applications P2001-268680, filed on Sep. 5, 2001, and P2002-219090, filed on Jul. 29, 2002, the entireties of which are incorporated herein by reference.

BACKGROUND OF THE INVENTION

1. Field of the Invention

The present invention relates to an optical waveguide device, an optical modulator, a mounting structure for an optical waveguide device and a supporting member for an optical waveguide substrate.

2. Related Art Statement

Recent development of multimedia systems demands a broadband communication network system. An optical transmission system operating on a frequency higher than 10 Gb/s has been already commercialized. Such a system capable of operating on a higher frequency is expected. For example, a lithium niobate optical modulator or a semiconductor filed absorption modulator (Electro-absorption modulator: EA modulator) is used as a device for modulating an electrical signal (microwave signal) with a frequency of not lower than 10 Gb/s.

A lithium niobate optical modulator is composed of a Mach-Zehnder type optical waveguide and a travelling wave type electrode. In such a modulator, for realizing a high frequency modulation of a microwave signal with a frequency not lower than 10 Gb/s, it is important and indispensable to satisfy a velocity matching condition of the microwave signal and optical wave. Historically, the velocity matching has been satisfied by providing a thicker electrode or by forming a layer made of a low dielectric constant between a substrate and electrode, so as to reduce the effective refractive index of the microwave signal.

Alternatively, a thinner optical waveguide substrate may be provided with a thickness of as small as 10 μm for satisfying the velocity matching condition at a higher frequency. Thickness of 10 μm, however, is the same level as the size (half value width: $1/e^2$) of the optical waveguide. Therefore, the light spot propagating in the optical waveguide may be flattened so as to increase the connecting loss with an outer fiber connected with the waveguide. In addition to this, the surface roughness of the waveguide substrate may affect the light propagating in the waveguide so as to increase the propagating loss of the light. The assignee disclosed the following invention in Japanese Patent laid-open publication 133, 159A/1998 for providing a solution of the above problems. In the invention, a thicker portion including an optical waveguide and a thinner portion adjacent to the thicker portion are provided in an optical waveguide substrate used for a travelling wave type optical modulator. The thickness of the thinner portion is adjusted to a small value of, for example, 10 μm. It is thereby possible to prevent the deterioration of the optical insertion loss, and to realize a high frequency optical modulation without the necessity of a buffer layer of silicon oxide. Further, a product (Vπ·L) of a driving voltage Vπ and length of an electrode L may be advantageously reduced.

SUMMARY OF THE INVENTION

Further, the assignee filed Japanese patent application 101, 729/2001, and disclosed the following invention. That is, a thin optical waveguide substrate is joined with a separate reinforcing supporting body at the bottom face of the substrate to give an optical modulator with a mechanical strength sufficient for handling. Such a modulator with a thin optical waveguide substrate is free from the loss (ripple) of transmission property (S21) due to the resonance of substrate. Such ripple has been observed in a prior optical modulator using a thicker substrate with a thickness of several hundreds μm to several millimeters.

In such a modulator having a thin optical waveguide substrate joined with a separate supporting body, however, the inventors found that a ripple in S21 property of microwave may be observed in a frequency range lower than a frequency band intended for use.

When a microwave signal with a frequency of not lower than 10 Gb/s is supplied on an electrical terminal of an optical modulator, the reinforcing supporting body for the optical waveguide may have a thickness of the same level of the wavelength of the supplied microwave. The microwave may thereby induce the resonance of the reinforcing supporting body, resulting in a transmission loss of the microwave. Such transmission loss may be observed as ripples. An optical modulator may be used only in a frequency band lower than a frequency where a ripple is observed. For example, when an optical modulator is intended for use at a frequency of 40 Gb/s according to its specification, it is required to prevent a ripple due to the resonance of the supporting body at least in a frequency band not higher than 40 GHz.

It is assumed that the microwave signal applied on the optical waveguide substrate is leaked into the underlying reinforcing body to induce the resonance of the body.

An object of the present invention is to provide a novel optical waveguide device having an optical waveguide substrate and a supporting body for supporting the substrate, and to reduce the resonance due to the substrate radiation leakage into the whole of the waveguide substrate and supporting body.

Another object of the present invention is to shift a ripple of transmission property of microwave due to the resonance of the supporting body toward a higher frequency range.

The present invention provides an optical waveguide device comprising an optical waveguide substrate and a supporting body for supporting the waveguide substrate. The optical waveguide substrate has a main body made of an electro-optic material, an optical waveguide and an electrode for applying an electrical signal on the waveguide, and the supporting body has an opposing face opposing the main body of the waveguide substrate. The optical waveguide device further has a conductive layer covering at least a part of the opposing face of the supporting body.

Further, the present invention provides a supporting member having the supporting body and conductive layer.

Further, the present invention provides an optical modulator having the device wherein the electrode applies a voltage for modulating light transmitted in the optical waveguide.

Further, the present invention provides a mounting structure for an optical waveguide device, comprising the above optical waveguide device, a housing for fixing the device, and a high frequency connector for supplying a high frequency electrical signal on the electrode.

The inventors have studied the cause of a ripple in a frequency range of, for example, 20 to 45 GHz as described above in an optical waveguide device having an optical waveguide substrate and a supporting body for the substrate. They obtained the following results. That is, it is possible to shift the frequency, where the ripple due to the resonance is observed, toward a higher frequency, by applying a thinner supporting body for reinforcement. In other words, they have confirmed that the optical waveguide substrate may function together with the separate supporting body concerning the substrate radiation leakage.

Further, the inventors tried to provide a conductive layer between the modulator substrate (optical waveguide substrate) and the reinforcing body (supporting body). They finally found that it is thereby possible to cut the unnecessary radiation of microwave in a direction of the thickness of the substrate at the surface of the supporting body, because the electric field generated by the substrate radiation may be reduced to zero at the conductive layer. It is thereby possible to shift the frequency of the observed ripple due to the resonance toward a higher frequency range. Such solution is effective for considerably reducing the high frequency loss and shifting the frequency band intended for use of an optical modulator toward a higher frequency range.

The prior art does not disclose or teach shifting the frequency of the substrate radiation leakage ripple (or resonance) to a higher frequency band to reduce frequency losses in a structure having an optical waveguide substrate mounted on a supporting body.

The conductive layer may preferably be made of a material capable of reducing the electric field of the microwave to substantially zero. For example, the material for the conductive layer may preferably have a volume resistivity of not higher than $10^{-7}\Omega\cdot cm$, and may preferably be a metal having a high conductivity such as gold, silver or copper, and most preferably be a noble metal.

The thickness of the conductive layer is not particularly limited, and may be adjusted considering skin effect of the microwave signal at an operating frequency for reducing the electrical field of the microwave. Preferably, the thickness is not smaller than 0.05 μm in millimeter wave band and not smaller than 0.5 μm in microwave band.

The conductive layer is provided for cutting the substrate radiation leakage of the electric field induced by microwave into the supporting body and not particularly provided for reducing the adverse effects of pyroelectricity. The conductive layer may preferably by formed on the opposing face of the supporting body as a continuous layer.

In particular, it is possible to provide a conductive layer covering at least a part of a region of the opposing face under a feedthrough portion of the optical waveguide device. The reason is as follows. The resonance due to the microwave radiation leakage from an electrode into the main and supporting bodies described above is considerable in a feedthrough portion. The above conductive layer is effective for reducing the resonance.

In a particularly preferred embodiment, the main body of the optical waveguide substrate has a main face, bottom face opposing the supporting body, and two side faces provided in the direction of width of the main body. Signal and ground electrodes are formed on the main face. An electrode gap is formed between the signal and ground electrodes. A feedthrough gap is formed between an end portion of the signal electrode and the side face, and between the electrode gap and the side face. The conductive layer covers at least a region of the opposing face under the feedthrough gap, because the substrate radiation leakage is most considerable in the feedthrough gap between the electrodes and the side face of the main body.

Impedance mismatching may be observed in portions other than the above described feedthrough portion in the optical waveguide device. Such mismatched portions include curved parts of the signal or ground electrodes, deviations of line widths of the signal and ground electrodes, and deviations of the gap widths of the signal and ground electrodes. The substrate radiation leakage of microwave may be induced by the mismatched portions so that the resonance of the supporting and main bodies may be caused, and a ripple in the S21 property may be observed. It is possible to reduce the ripples due to the curvature of the electrodes, the deviations of the line widths and the gap widths of the electrodes may be effectively prevented, by forming a conductive layer covering substantially whole of the opposing face of the supporting body.

The shape or dimension of the supporting body is not particularly limited, and preferably be a shape of a plate.

The main body for constituting the optical waveguide substrate is made of an electro-optic material having ferroelectricity and may preferably be made of a single crystal. Such crystal is not particularly limited as long as it is effective for light modulation, and includes lithium niobate, lithium tantalate, lithium niobate-lithium tantalate solid solution, potassium lithium niobate, KTP, GaAs and quartz.

The electrode may be made of a material having a low resistance and excellent impedance property, including gold, silver, copper or the like.

The material for the supporting body is not particularly limited. It is possible to prevent the influence of the change of ambient temperature on the light modulation by reducing the difference between the linear thermal expansion coefficient of the main body and that of the supporting body. In this case, the materials for the main and supporting bodies may be the same or different from each other.

The material for the supporting body may preferably be a material having a dielectric constant not lower than that of the electro-optic material constituting the main body of the waveguide substrate. In this case, the supporting body may preferably be substantially made of the same kind of single crystal as the main body.

This embodiment includes the case that the main formulation (for example, main formulation constituting not less than 80 mole percent of the whole) is common in the supporting and main bodies. An ingredient or ingredients other than the main formulation may be the same or different from each other.

A buffer layer may be provided between the surface (main face) and electrode. The buffer layer may be made of any known material such as silicon dioxide, magnesium fluoride, silicon nitride and alumina.

In a preferred embodiment, the optical waveguide is formed in or on the side of the main face of the main body. The optical waveguide may be a ridge type optical waveguide directly formed on the main face of the main body, or a ridge type optical waveguide formed on another layer on the main face of the main body. Alternatively, the optical waveguide may be an optical waveguide formed by inner diffusions process such as titanium diffusion process, or an optical waveguide produced by ion exchange process such as proton exchange. The electrode may be on the side of the main face of the main body as described above. The electrode may be directly formed on the main face of the main body, or may be formed on a buffer layer on the main face.

The optical waveguide substrate and supporting body may be joined with each other by a process not particularly limited. The substrate and body may preferably be joined using an adhesive. In this case, the adhesive may preferably have a refractive index lower than that of an electro-optic material for the substrate. Moreover, the dielectric constant of the adhesive may preferably be lower than that of the electro-optic material for the main body.

The type of adhesive agent used is not particularly limited, as long as it satisfies the aforementioned conditions. The adhesive includes an epoxy adhesive, a thermal setting type adhesive, an ultraviolet curable adhesive, and a ceramic adhesive having a thermal expansion coefficient near that of the electro-optic material such as lithium niobate, for example "ALON CERAMICS C" (manufactured by Toa Gosei Co. Ltd. and having a thermal expansion coefficient of $13 \times 10^{-6}$/K.).

These and other objects, features and advantages of the invention will be appreciated upon reading of the following description of the invention when taken in conjunction with the attached drawings, with the understanding that some modifications, variations and changes of the same could be easily made by the skilled person in the art.

PREFERRED EMBODIMENTS OF THE INVENTION

The present invention will be described further in detail, referring to the attached drawings.

Figure 1:
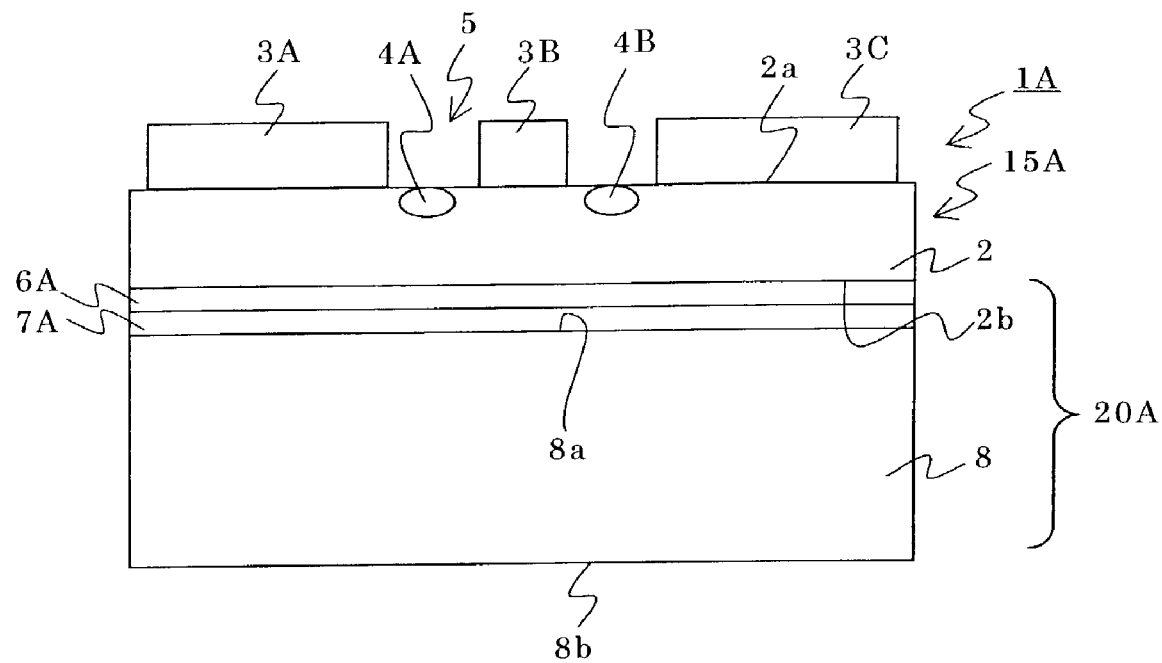
FIG. 1 is a front view schematically showing an optical waveguide device 1A according to the present invention.
Figure 2:
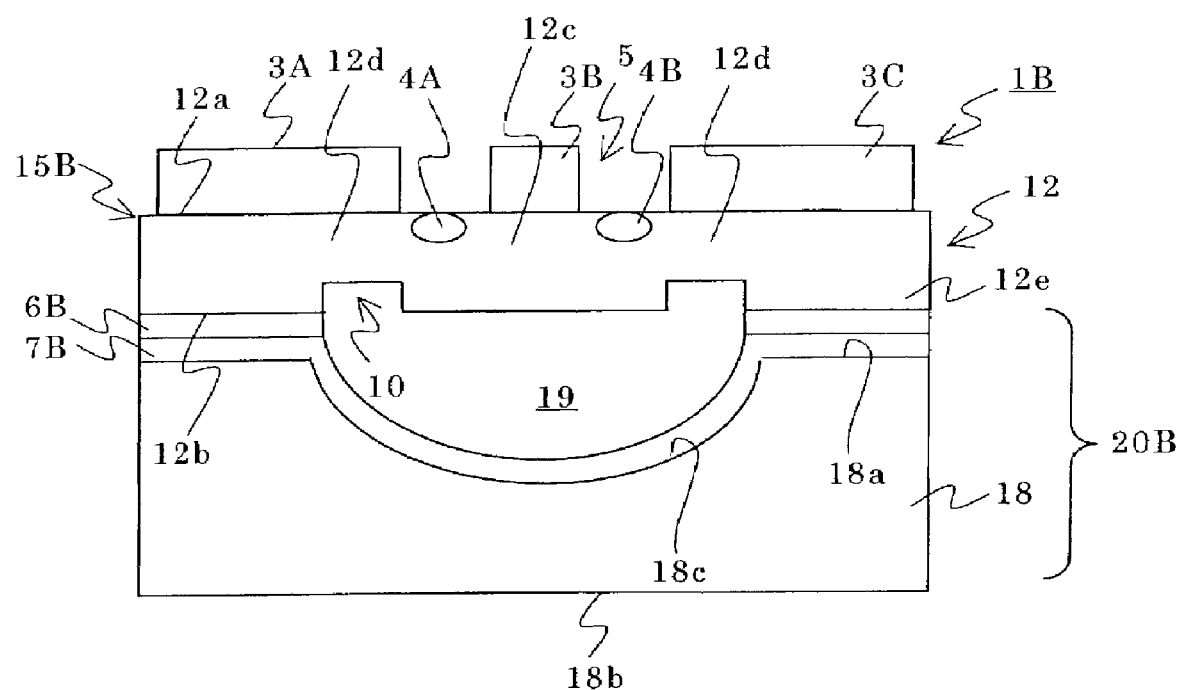
FIG. 2 is a front view schematically showing an optical waveguide device 1B according to another embodiment of the invention.
Figure 3:
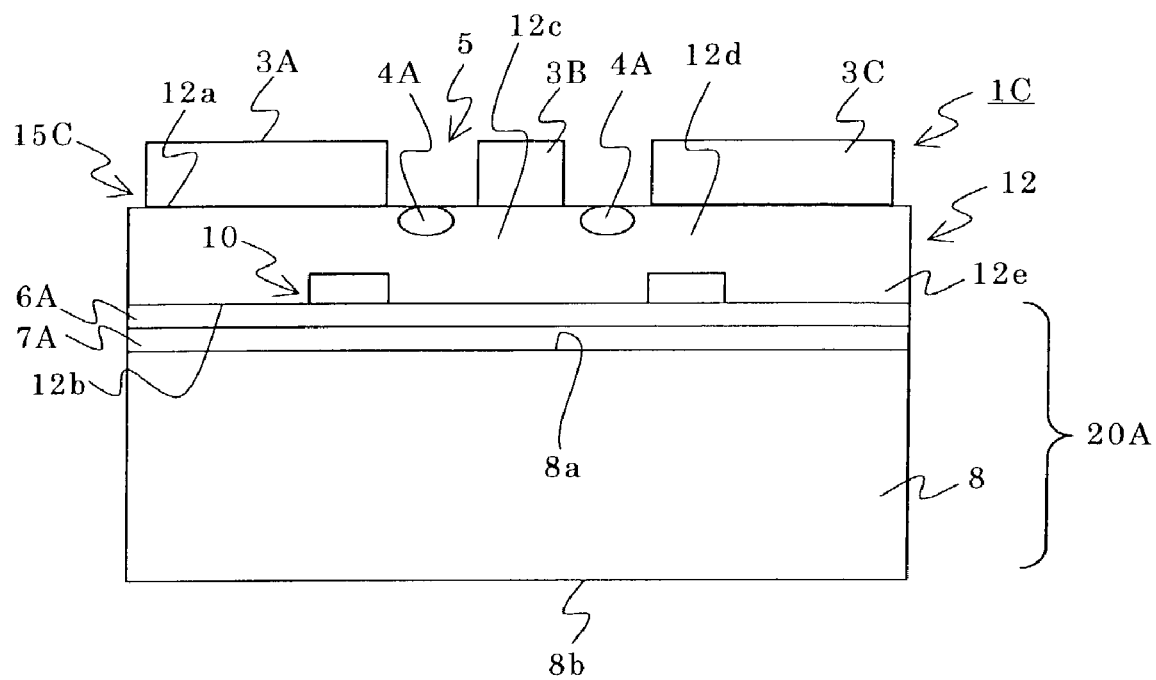
FIG. 3 is a front view schematically showing an optical waveguide device 1C according to the present invention.

In a preferred embodiment, a joining layer is interposed between the opposing face of the main body of an optical waveguide substrate and conductive layer. FIGS. 1 to 3 relate to a device according to this embodiment.

An optical modulator 1A has an optical waveguide substrate 15A and a supporting body 8. The main and supporting bodies 2 and 8 respectively are plate-shaped. Predetermined electrodes 3A, 3B and 3C are formed on a main face 2a of the main body 2. Although a so called coplanar waveguide type electrode (CPW electrode) configuration is provided in this example, the configuration of electrodes are not particularly limited. In this example, a pair of branch-type optical waveguides 4A and 4B are formed between the neighboring electrodes, so that a signal voltage may be applied onto each of the optical waveguides 4A and 4B in a direction substantially parallel with the main face 2a. The optical waveguides 4A and 4B are of Mach-Zehnder type structure, which is well known and is not particularly illustrated.

The supporting body 8 has an opposing face 8a opposing to a bottom face 2b of the main body 2. A conductive layer 7A covers substantially the whole of the opposing face 8a as a continuous layer. A joining layer 6A is interposed between the conductive layer 7A and opposing bottom face 2b, and joins the body 2 and 8 with each other. 20A is a supporting member.

In a preferred embodiment, a space 10 is formed in the optical waveguide device. Such a space 10 is effective for further improving the velocity of propagation of a microwave signal. FIGS. 2 and 3 relate to this embodiment.

In a preferred embodiment, a space is formed on the opposing face of the supporting body to form the space 19. FIG. 2 relates to this embodiment.

An optical waveguide device 1B of FIG. 2 has parts substantially same as those of the device 1A of FIG. 1. Such parts are specified using the same numerals as those in FIG. 1 and the explanation is omitted. A main body 12 has a main face 12a, on which electrodes and optical waveguides are provided. A space 10 is formed on the side of an opposing face 12b of the main body 12. As a result, the main body 12 has two thinner portions 12d, a central portion 12c and two outer base portions 12e.

A supporting body 18 has a flat bottom face 18b and upper opposing face 18a on which a space 19 is formed. A conductive layer 7B covers the main face 18a and the surface 18c of the space 19. The opposing face 18a of the supporting body 18 and the bottom face 12b of the main body 12 are joined with a joining layer 6B. 20B is a supporting member.

By using the device 1B, the mechanical strength of the whole device may be preserved by the supporting body 18 having a relatively large thickness. It is thus possible to provide a strength sufficient for handling the whole device and to prevent the warping of the main body 12. It is also possible to improve the velocity of propagation of microwave signals in the electrodes, by using a main body 12 having a relatively small thickness and forming a space 19 with a sufficiently large depth in the supporting body 18.

In the invention, a low dielectric material with a dielectric constant lower than that of the electro-optic material for the main body may be set in the space 19 formed in the supporting body. In this case, it is preferred that the low dielectric material directly contacts with the main body 12. It is thereby possible to reinforce or support the thin main body with the low dielectric material.

Such low dielectric material includes a glass, an organic adhesive such as an epoxy resin, acrylic resin or the like, a layer insulator for producing a semiconductor, and polyimide resin.

In a device 1C shown in FIG. 3, the optical waveguide substrate 12 shown in FIG. 2 and supporting body 8 shown in FIG. 1 are joined with a joining layer 6A.

In a preferred embodiment, the thickness of the main body for the optical waveguide device is not larger than 200 µm and more preferably, not larger than 100 µm. When a space 10 is formed in the main body for the device, the thickness of the thinner portion of the main body where the space 10 is formed may preferably be not larger than 100 µm, more preferably, not larger than 50 µm, and most preferably, not larger than 30 µm.

In the present invention, there may be applied a so called asymmetric coplanar strip line electrode (A-CPS electrode) pattern. The invention may also be applied on a travelling wave optical modulator of a so called independent modulation type.

The space 10 and the space 19 may be formed by laser ablation, using an excimer laser, or dicing.

In a preferred embodiment, an optical waveguide substrate and supporting body may be joined with the conductive layer. The conductive layer can be made of a conductive adhesive agent. It is thus possible to provide an optical modulator with a simpler structure.

The conductive adhesive agent includes a carbon paste, silver paste and anisotropic conductive film.

FIGS. 4 to 7 relate to devices according to this embodiment. A device 1D shown in FIG. 4 has an optical waveguide 12 and supporting body 8 joined with a conductive adhesive 11A. 20C is a supporting member.

Figure 5:
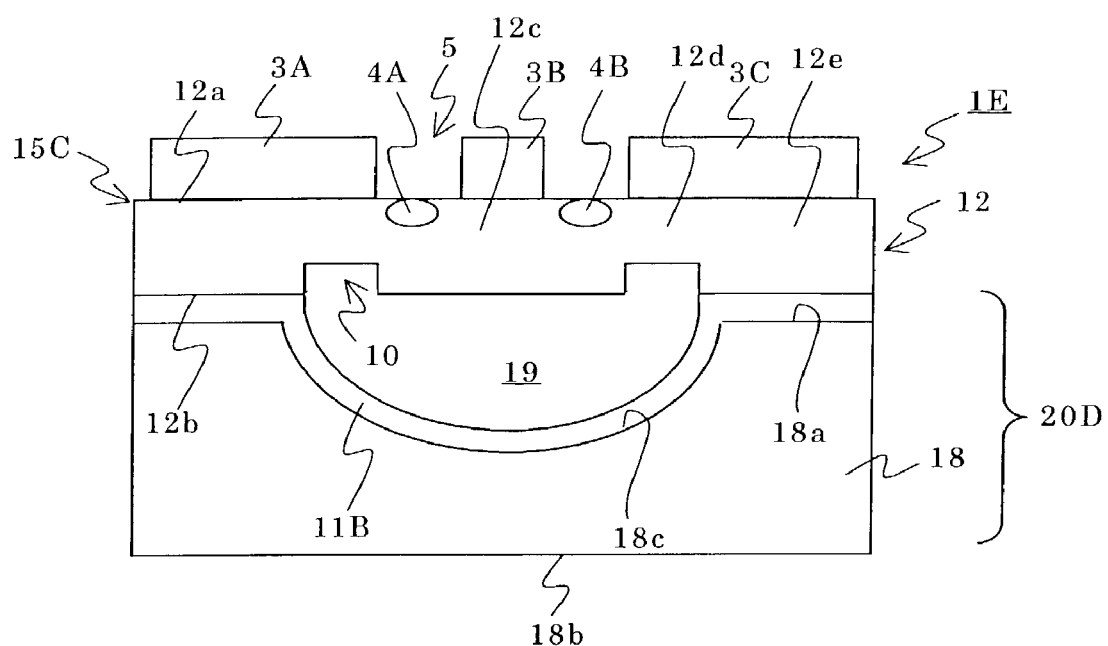
FIG. 5 is a front view schematically showing an optical waveguide device 1E according to the present invention.

A device 1E shown in FIG. 5 has an optical waveguide substrate 12 and supporting body 18 joined with each other. A conductive layer 11B is formed on an covers the upper opposing face 18a of the body 18 and the surface 18c exposed to a space 19. The bottom face 12b of the substrate 12 and opposing face 18a of the body 18 are joined with the conductive adhesive 11B. 20D is a supporting member.

Figure 6:
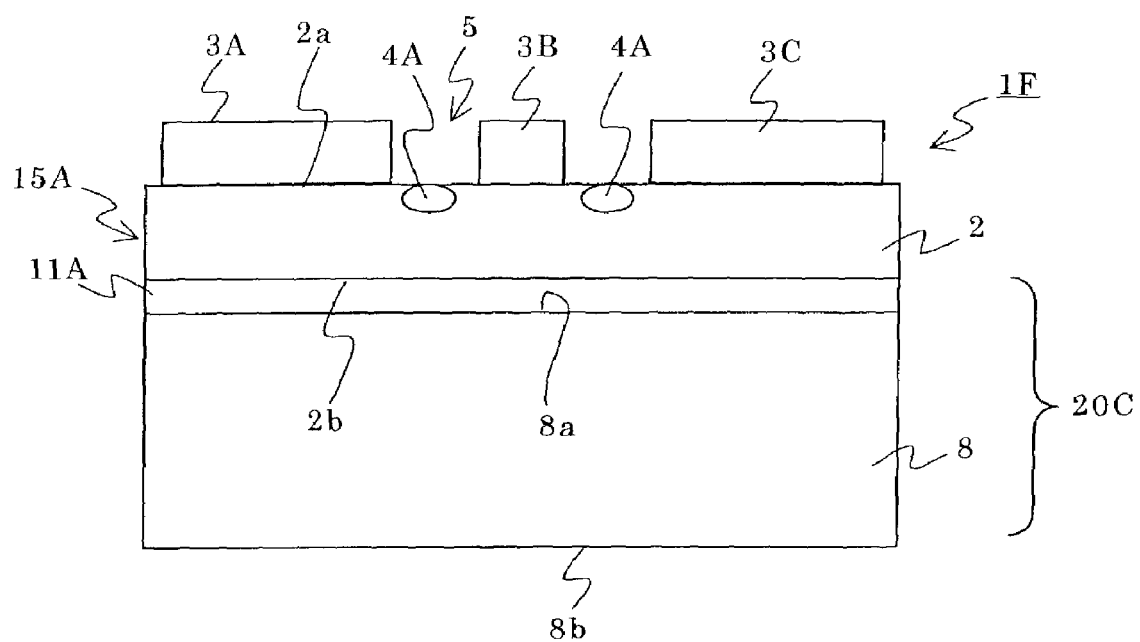
FIG. 6 is a front view schematically showing an optical waveguide device 1F according to another embodiment of the invention.

In a device 1F of FIG. 6, the bottom face 2b of the main body 2 and the opposing face 8a of the supporting body 8 are joined with a conductive layer 11A.

The structure for mounting a optical waveguide device according to the present invention has the inventive optical waveguide device, a housing for fixing the modulator, and a high frequency connector for supplying a high frequency electrical signal on the electrode. The shape or type of the housing or connector is not particularly limited.

In a preferred embodiment, when the structure is mounted in a package, a high frequency connector of the vertical contact coaxial type is used. Such combination has the following advantages.

When so called K connector or V connector is used, its coaxial pins are contacted from the side face of the optical waveguide substrate. When a coaxial pin is used, different from a probe, the radiation from the coaxial pin may be easily connected with the supporting body. The influence of the substrate radiation in the supporting body has been more considerable.

Figure 7:
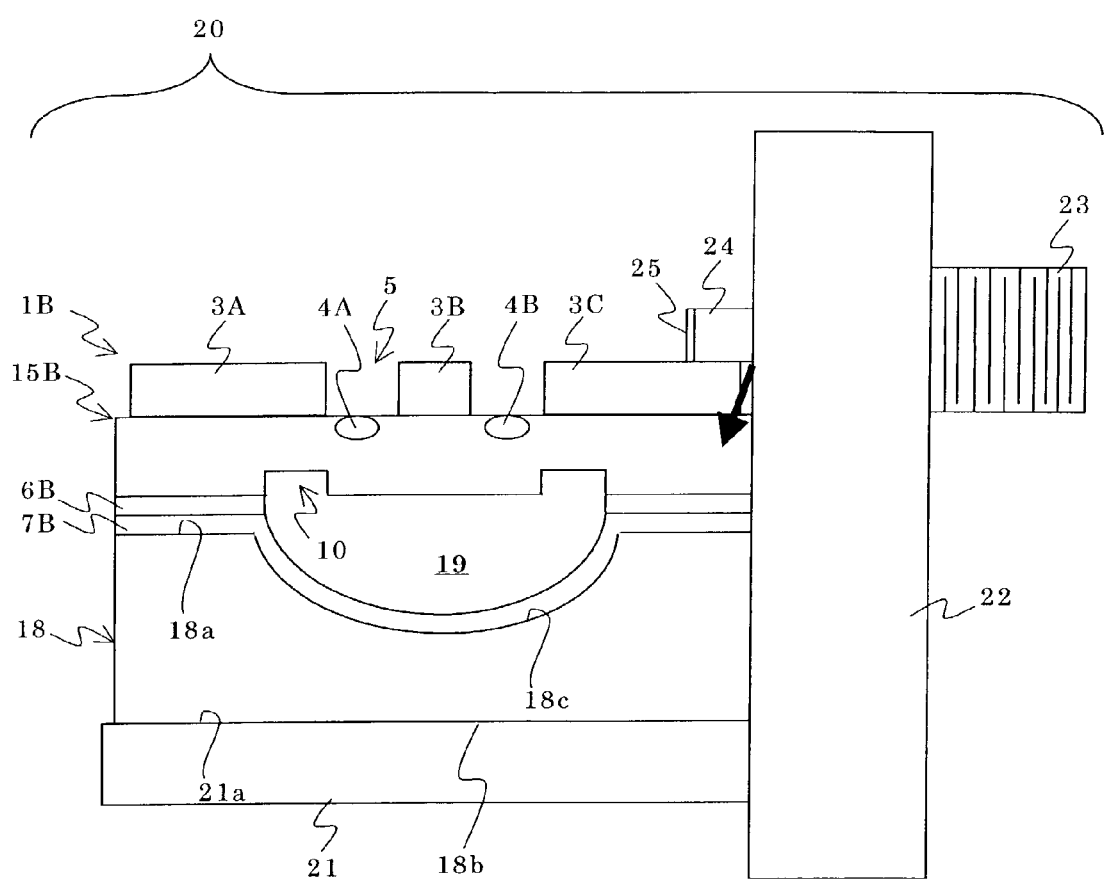
FIG. 7 is a diagram schematically showing an optical modulator fixed on a V-connector.

FIG. 7 shows on embodiment of an optical modulator connected with the one of the conventional connectors described above. The inventive optical modulator such as the modulator 1B is fixed on the surface 21a of a mount 21 of a housing 22. An outer connector 23 is equipped with the housing 22. A coaxial pin 25 is equipped with the tip portion 24 of the connector 23. Microwave radiation from the coaxial pin 25 may be radiated easily toward the supporting body 18 as shown by an arrow.

Figure 10:
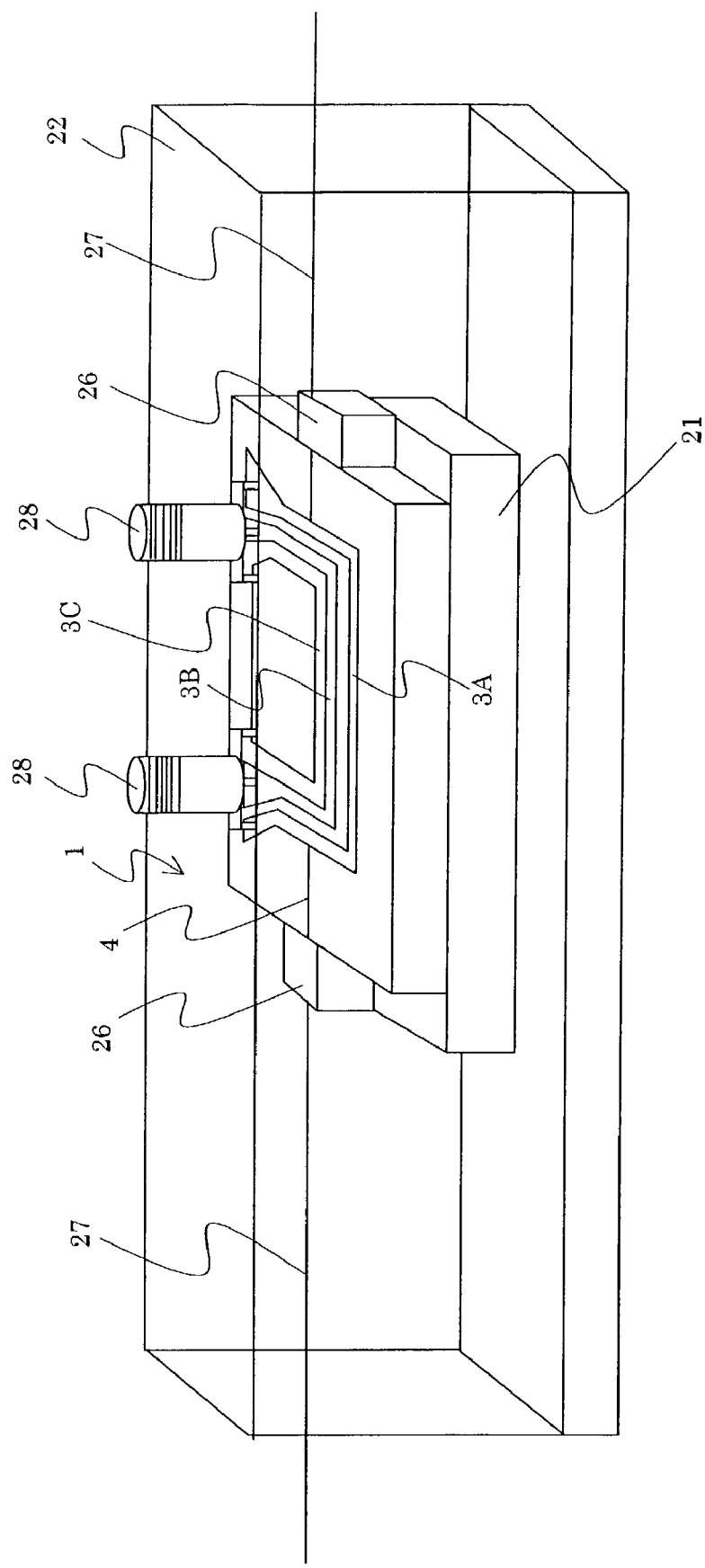
FIG. 10 is a drawing schematically showing an optical modulator fitted to a connector of vertical contact coaxial type.

FIG. 10 shows an example using the connector of the vertical contact coaxial type described above. In FIG. 10, an optical modulator 1 is mounted on a mount 21 of a housing 22. Optical fibers 27 are connected with both end faces of the modulator 1, respectively, using optical fiber arrays 26. The housing 22 has, for example, a pair of connectors 28. Each connector 28 has a coaxial pin, which is fixed directly over the corresponding electrode and connected to it. The radiation from the coaxial pin is radiated directly into the upper main face of the optical waveguide substrate, with only little radiation from the side face of the substrate. Such radiation into the substrate from the upper main face may be effectively cut by the conductive layer of the invention. The effect of the invention is thus considerable in this case.

It is thus possible to realize the same kind of contact with a CPW probe and to prevent the radiation of unnecessary waves into the supporting body in the direction of thickness, thereby shifting the ripple due to the resonance to a higher frequency range.

Figure 11:
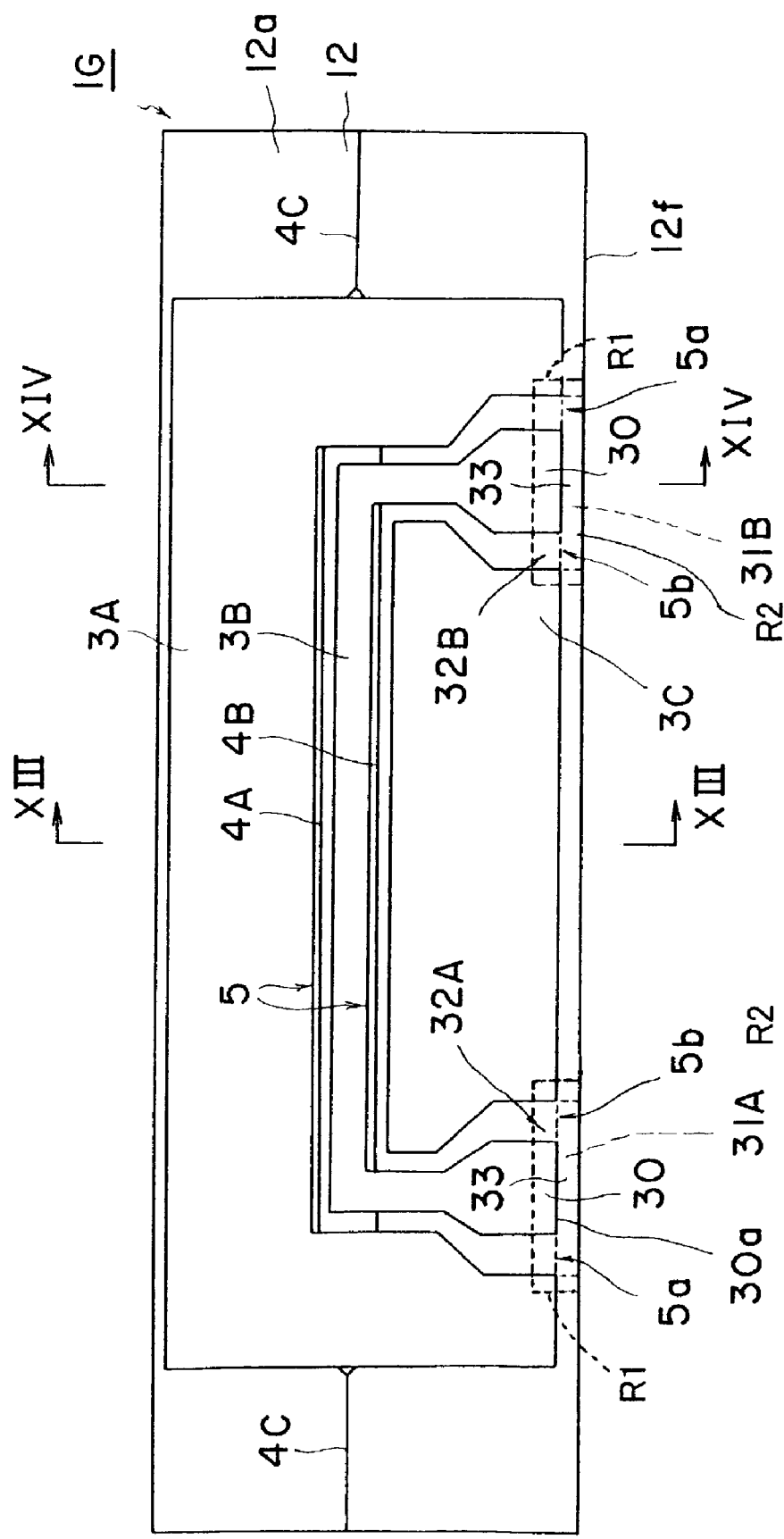
FIG. 11 is a plan view schematically showing an optical waveguide device 1G according to another embodiment of the invention, for indicating the locations of a signal electrode 3B, ground electrodes 3A, 3C, electrode gaps 5a, 5b and 5, feedthrough gaps 33 and conductive layers 31A, 31B.
Figure 12:
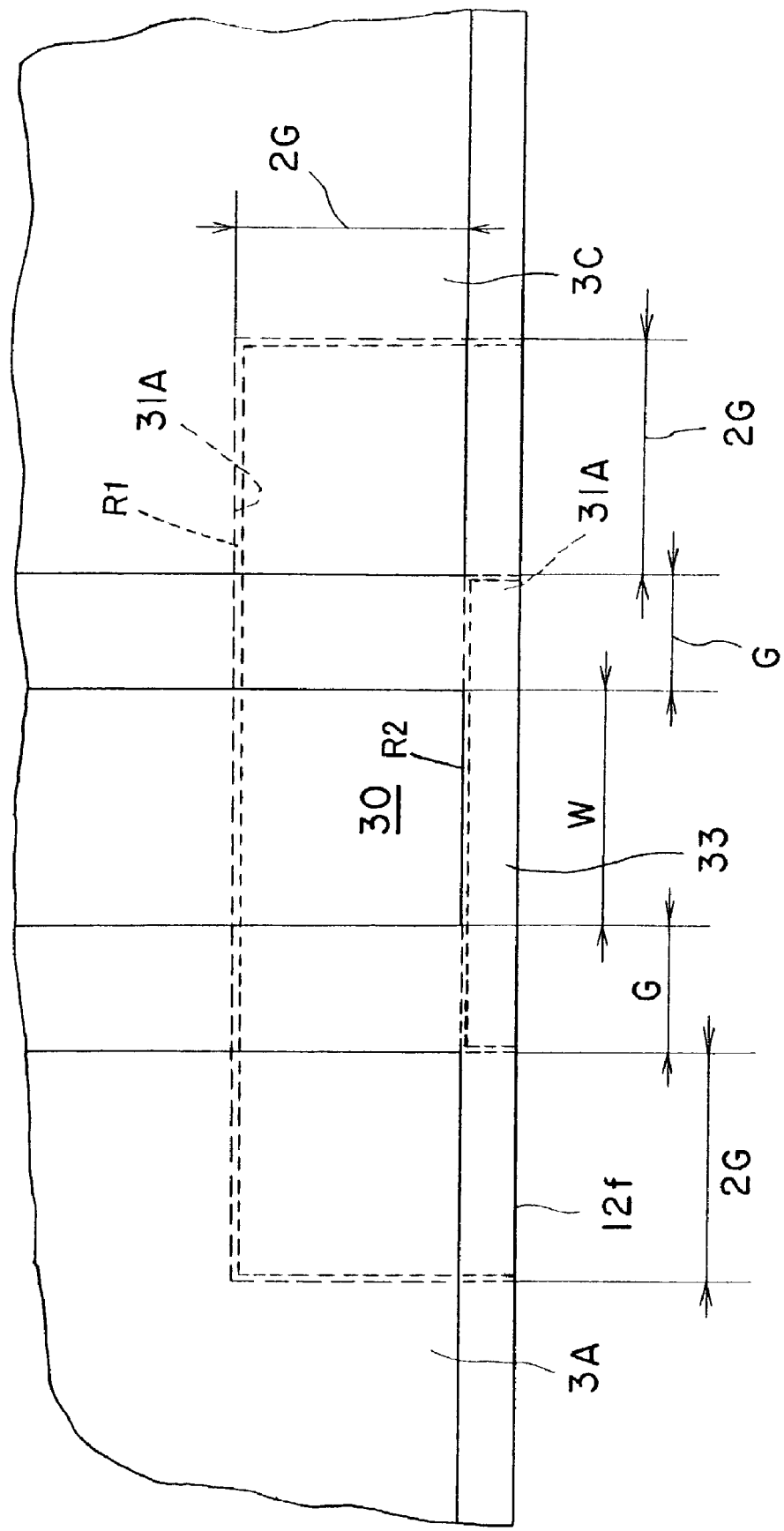
FIG. 12 is an enlarged view of FIG. 11 mainly showing a feedthrough portion of the device.
Figure 13:
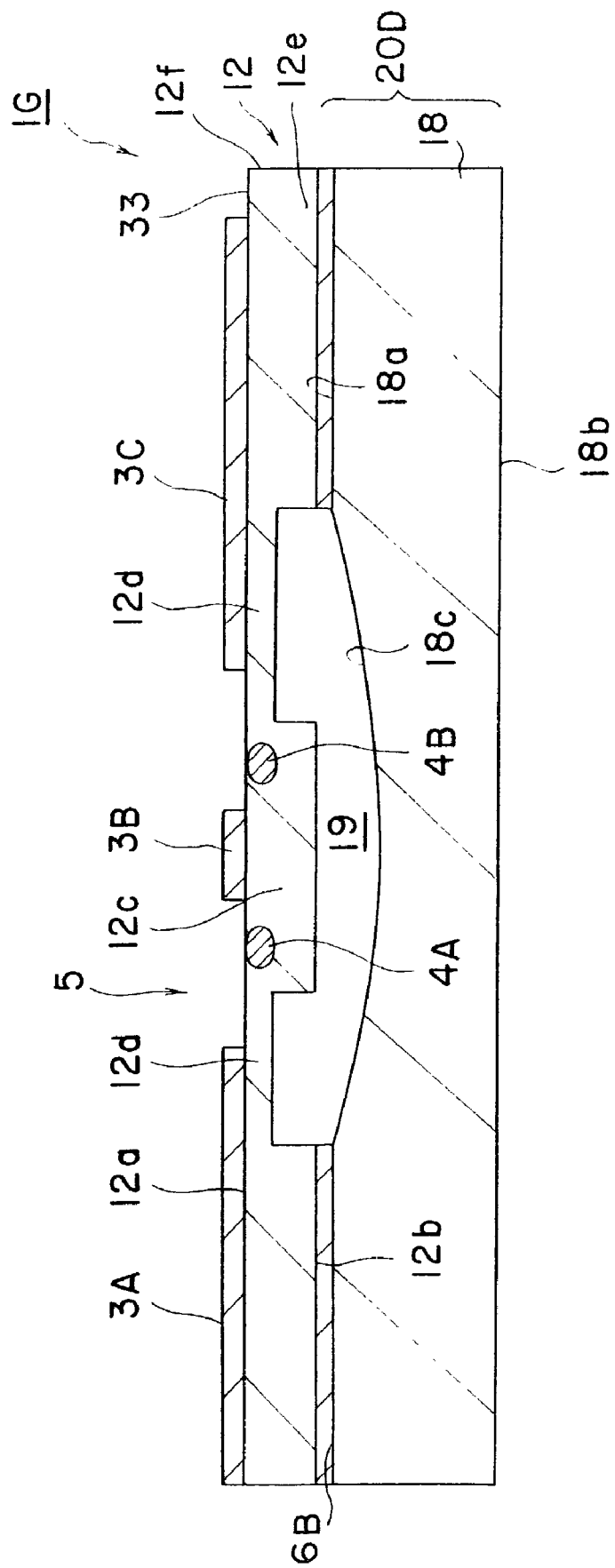
FIG. 13 is a cross sectional view showing the device of FIG. 11 cut along a XIII—XIII line.
Figure 14:
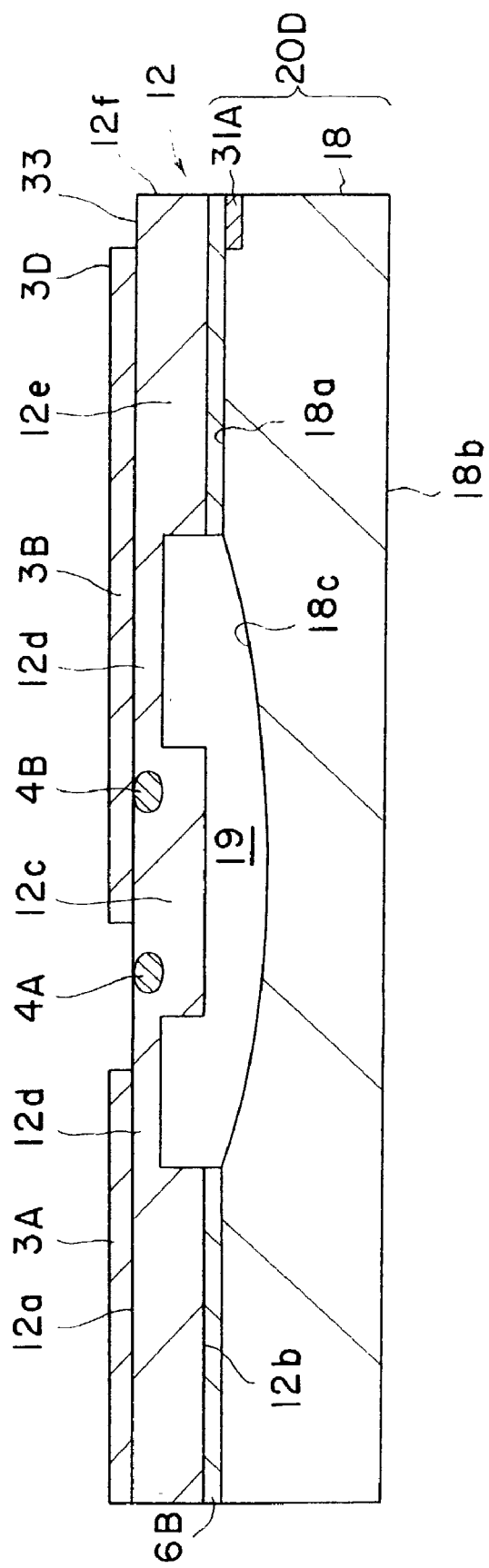
FIG. 14 is a cross sectional view showing the device of FIG. 11 cut along a XIV—XIV line.

In a preferred embodiment, the conductive layer covers at least a region of the opposing face under the feedthrough portion. FIGS. 11 to 14 relate to this embodiment. FIG. 11 is a plan view schematically showing an optical waveguide device 1G, FIG. 12 is an enlarged view of the feedthrough portion shown in FIG. 11, FIG. 13 is a cross sectional view of the device of FIG. 11 cut along a line XIII—XIII, and FIG. 14 is a cross sectional view of the device of FIG. 11 along a XIV—XIV line.

Each of the main and supporting bodies 12, 18 has a shape of a plate. Optical waveguides 4A, 4B and 4C of Mach-Zehnder pattern are provided on the main face of the main body 12. A signal electrode 3B is provided between a pair of ground electrodes 3A and 3C.

A space 19 is formed on a supporting face 18a of a supporting body 18, as can be seen in FIG. 13. Preferably, the space 19 is defined by a smooth and curved face. The shape of the main body 12 is substantially the same as that shown in FIG. 2. A joining layer 6B is interposed between the opposing face 18a of the body 18 and a base portion 12e the main body 12, for joining the bodies 12 and 18. 20D is a supporting member.

In the example shown in FIG. 11, a pair of feedthrough portions 32A and 32B are provided for the electrodes 3A, 3B and 3C. In each feedthrough portion, the signal electrode 3B has an end part 30 with a larger width. The electrode gaps 5a and 5b between the signal electrode 3B and ground electrodes 3A, 3C are widened in the end portion 30. The widened end portion 30 and gaps are provided in each feedthrough portion for the matching of characteristic impedance with an outer electrode provided in an outer connector.

In the present example, a feedthrough gap 33 is provided between the end part 30a of the signal electrode 30 and the side face 12f of the main body 12, and between the electrode gap 5a or 5b and the side face 12f. Conductive layers 31A and 31B cover regions R2 of the opposing face 18a under the feedthrough gaps 33, respectively. It is thereby possible to reduce the ripple due to substrate radiation from the connecting part of the signal and ground electrodes and an outer connector. R1 is a region of the opposing face 18a under the feedthrough portion 32A or 32B.

A conductive layer may preferably cover at least a region R2 of the opposing face right under the feedthrough gap 33. The conductive layer, however may preferably cover the adjacent parts surrounding the gap 33, as the layer 31A shown in FIG. 12. For example, a distance between the outer periphery of the conductive layer 31A and the periphery of gap 33 may preferably be not smaller than 2G, and more preferably not smaller than 3G, provided that the width of the gap 5a or 5b is G. It is thereby possible to further reduce the substrate radiation from the connecting portion of the electrodes 3A to 3C and an outer connector.

In a preferred embodiment, the supporting body has a pair of side faces in the direction of the width, and side conductive layers are provided on the side faces, respectively. The side conductive layers are electrically connected with each other. It is thereby possible to further reduce the incidence of the ripple.

Figure 15:
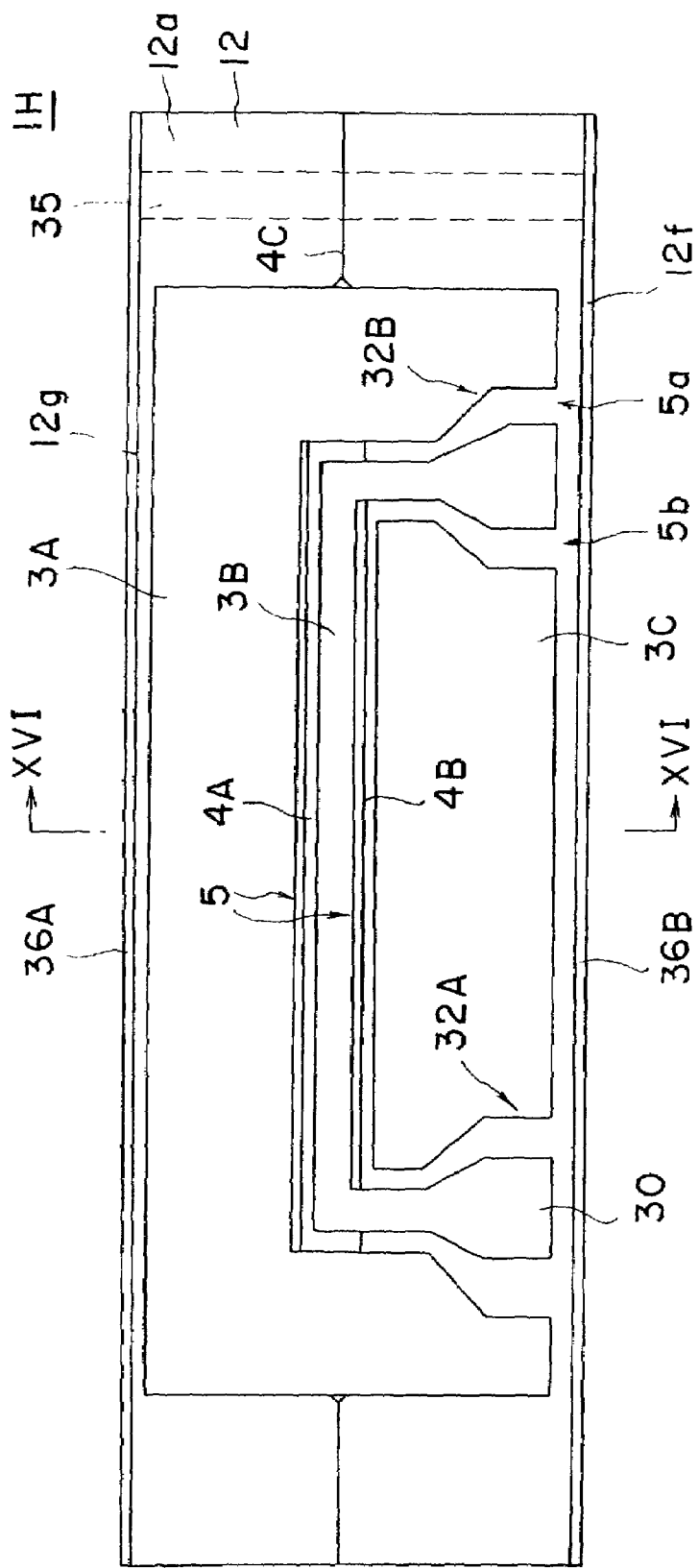
FIG. 15 is a plan view schematically showing an optical waveguide device 1H according to still another embodiment of the invention, in which side conductive layers 36A and 36B are formed on side faces 12f and 12g of a main body 12, respectively.
Figure 16:
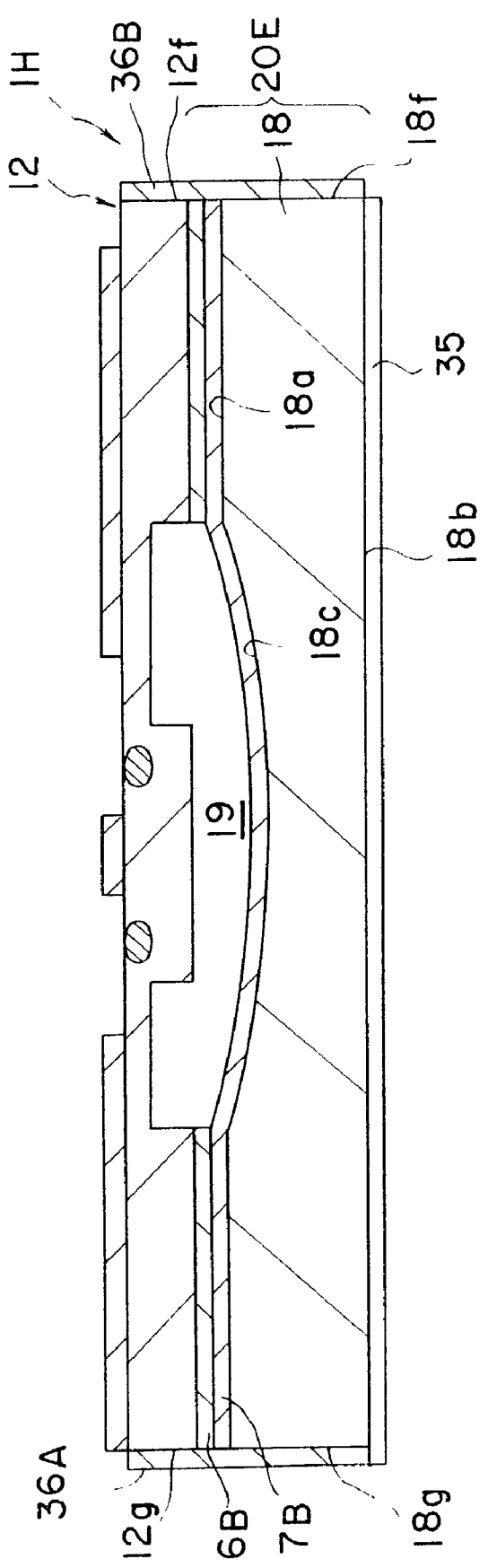
FIG. 16 is a cross sectional view of the device 1H of FIG. 15 cut along a XVI—XVI line.

FIGS. 15 and 16 relate to this embodiment. FIG 15 is a plan view schematically showing an optical waveguide device 1H according to the invention, and FIG. 16 is a cross sectional view of the device of FIG. 15 cut along a XVI—XVI line.

In the present invention, the main and supporting bodies 12 and 18 are substantially same as those shown in FIG. 2. In FIGS. 15 and 16, a side conductive layer 36A is formed to cover the side face 18g of the body 18 and side face 12g of the body 12. A side conductive layer 36B is formed to cover the side face 18f of the body 18 and side face 12f of the body 12. The side conductive layers 36A and 36B are connected with each other through an electrical connecting portion 35 on a bottom face 18b.

The material for the side conductive layer is not particularly limited, and may preferably have a volume resistivity of not higher than $10^{-4}$ Ω•cm. The material may more preferably be a metal having a high conductivity such as gold, silver or copper, and most preferably be a noble metal.

The thickness of the side conductive layer is not particularly limited, and may be adjusted considering the skin effects of microwaves at an operating frequency for reducing the electrical field of the microwave. Preferably, the thickness is not smaller than 0.05 μm in millimeter wave band and not smaller than 0.5 μm in microwave band.

A pair of the side conductive layers may be electrically connected with a method not particularly limited. For example, a connecting part 35 may be provided on the main body 12. Alternatively, the side conductive layers may be electrically connected with a conductive layer 7B provided on the opposing face. Further, a pair of the side conductive layers may be connected with a bonding wire.

EXAMPLES (Example 1)

An optical modulator 1A shown in FIG. 1 was produced. In detail, an X-cut 3 inch wafer (made of $LiNbO_3$ single crystal) was used as a substrate. Optical waveguides 4A, 4B of Mach-Zehnder type were formed in the surface area of the wafer by titanium diffusion and photolithography. The size of the optical waveguide may be set at, for example, 10 μm at $1/e^2$. CPW electrodes 3A, 3B and 3C were formed by electroplating. The electrode gaps of the central signal electrode 3B and ground electrodes 3A, 3C were 40 μm, the thickness of each electrode was 30 μm, and the length of the electrode was 40 μm.

A dummy wafer for grinding was then fixed on a grinding surface plate, and the main body (wafer) for a modulator was adhered onto the dummy wafer with the main face (with the electrodes) facing the dummy wafer. The main body (wafer) 2 for a modulator was then subjected to horizontal grinding, lapping and polishing (CMP) so as to machine the main body 2 to a thickness of 15 μm. A conductive layer 7A of Au with a thickness of 1 μm was then formed on an opposing face 8a of a plate-shaped supporting body 8. The supporting body 8 was adhered and fixed on the main body for a modulator as shown in FIG. 1, using a film-shaped resin with a thickness of 100 μm. End faces of each optical waveguide (connecting faces for outer optical fibers) were optically polished. The resulting wafer was then cut with a dicing machine to obtain chips. Each chip had a width of 4.4 μm. The obtained device 1A had a total thickness of 1 mm.

A single core fiber array supporting a 1.55 μm polarization optical fiber was produced. This array was contacted with one end face for input of the optical modulator chip 1A. Another single core fiber array supporting a 1.3 μm single mode optical fiber was produced. This array was contacted with the other end face for output of the chip 1A. The optical axes of the fibers were adjusted with those of the optical waveguides, and the arrays and chip were adhered with an ultraviolet light curable resin adhesive.

Figure 8:
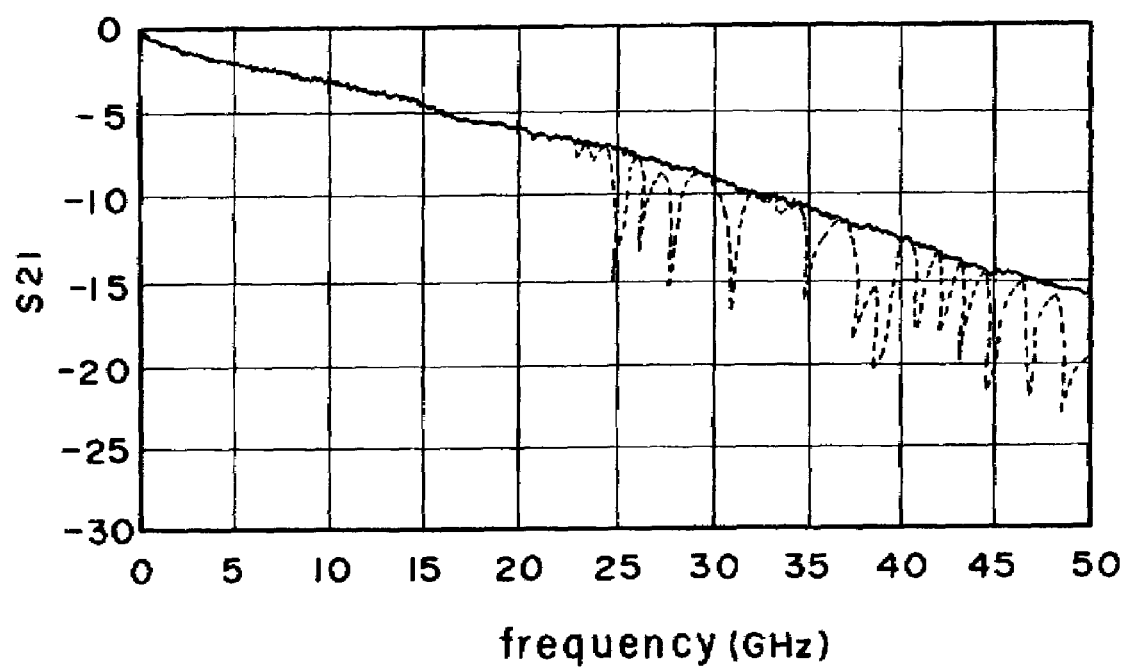
FIG. 8 is a graph showing the relationship of S21 and frequency in the invention example 1 and comparative example 1.

The transmission property S21 was measured using a vector network analyzer using a CPW probe "ACP 50-250" supplied by Cascade. The results are shown in FIG. 8 as a solid line. As a result, the refractive index of microwave "nm" was 2.4 A ripple is not observed within a frequency a range measured.

(Example 2)

An optical modulator 1B shown in FIG. 2 was produced. Ti diffusion optical waveguides and CPW electrodes were formed on an X-cut wafer of lithium niobate, as described in the example 1. The shapes and dimensions of the electrodes were the same as those in the example 1. A dummy wafer for grinding was then fixed on a grinding surface plate, and a main body (wafer) for a modulator was adhered onto the dummy wafer with the main face with the electrodes facing the dummy wafer. The main body (wafer) 2 for a modulator was then subjected to horizontal grinding, lapping and polishing (CMP) so as to machine the main body 2 to a thickness of 15 μm. The main body was then worked with an excimer laser at a region near the ground electrodes to a thickness of 10 μm to form a recess 10.

A space 19 with a width of 0.3 mm and a depth of 0.1 mm was formed in a supporting body 18. A conductive layer 7B of Au with a thickness of 1 μm was then formed on the opposing faces 18a and 18c. The supporting body 18 was adhered and fixed on the optical waveguide device 15B, using a film-shaped epoxy resin with a thickness of 100 μm. End faces of each optical waveguide to be connected with outer optical fibers were optically polished. The resulting wafer was then cut with a dicing machine to obtain chips. Each chip 1B and a width of 4.4 μm and a total thickness of 1 mm.

Figure 9:
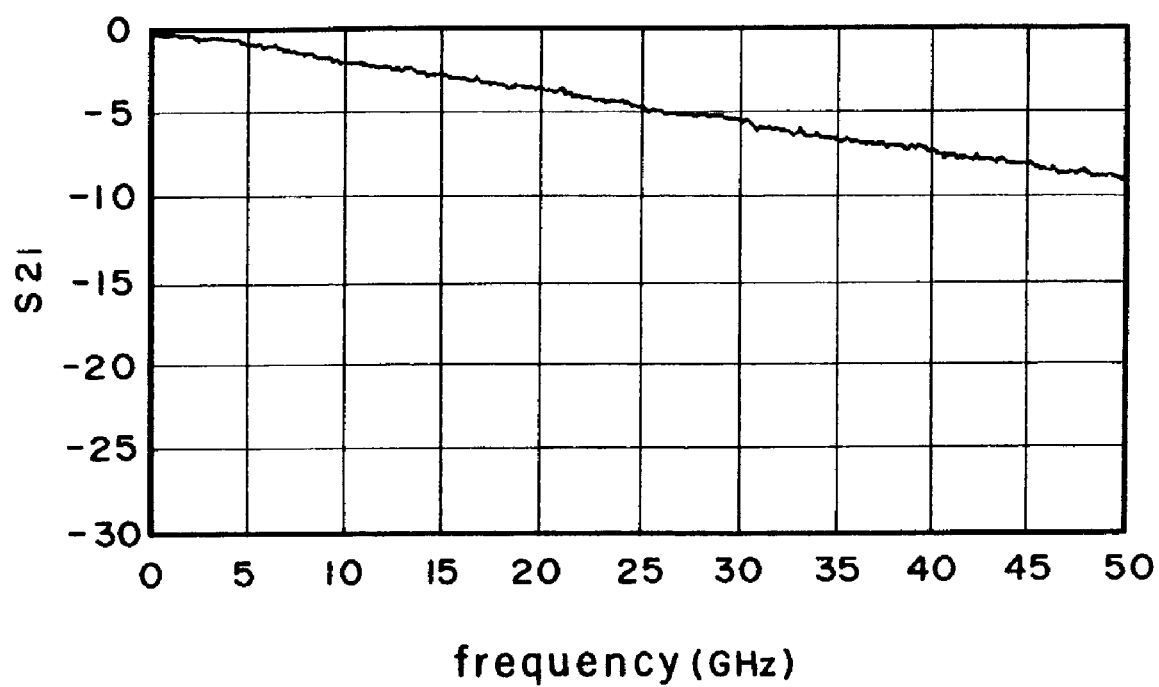
FIG. 9 is a graph showing the relationship of S21 and frequency according to the invention example 2.

The transmission property S21 was measured using a vector network analyzer using a CPW probe "ACP 50-250" supplied by Cascade. The results are shown in FIG. 9. As a result, the refractive index of microwave "nm" was 2.19. A ripple was not observed within a frequency range measured.

The modulator 1B was then mounted on a housing using a connector of the vertical contact coaxial type, as shown in FIG. 10. The S21 property was then measured using a vector network analyzer. As a result, the measured S21 property was same as that measured using a probe as described above. A ripple was not observed within a frequency range applied for this measurement.

(Example 3)

An optical modulator 1C shown in FIG. 3 was produced. The optical waveguide substrate 15C was produced according to the same process as described in the example 2. A conductive layer 7A made of gold with a thickness of 1 μm was formed on the surface of a plate-shaped supporting body 8. A main body for an optical modulator was adhered and fixed onto the supporting body 8, using a film-shaped epoxy resin with a thickness of 100 μm, to produce a wafer having optical modulators 1C. The resulting wafer was then cut with a dicing machine to obtain chips. Each chip 1C had a width of 4.4 μm and a total thickness of 1 mm.

The S21 property measured was the same as example 1. A ripple was not observed within a frequency range measured.

(Example 4)

Figure 4:
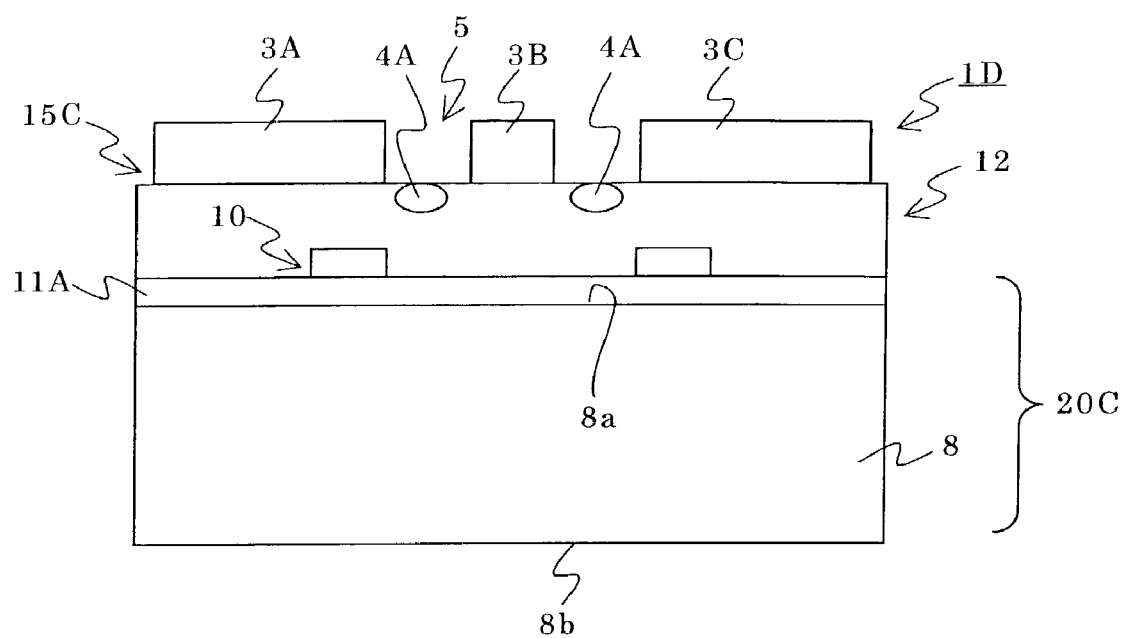
FIG. 4 is a front view schematically showing an optical waveguide device 1D according to another embodiment of the invention.

The device 4D shown in FIG. 4 was produced. First, the optical waveguide substrate 15C was produced according to the same process as the example 2. The bottom face of the substrate 15C was then adhered and fixed onto the opposing face 8a of the plate-shaped supporting body 8 with Ag paste to obtain an optical modulator 1D.

The connecting faces (end faces) of the optical waveguides to an outer optical fiber were polished. The resulting wafer was then cut with a dicing machine to obtain chips. Each chip 1D had a width of 4.4 μm and a total thickness of 1 mm.

The S21 property measured was the same as example 1. A ripple or loss was not observed within a frequency range measured.

(Example 5)

An optical modulator 1E shown in FIG. 5 was produced. That is, the optical waveguide substrate 15C was produced according to the same process as the example 2. Further same as the example 2. a space 19 was formed on the opposing face 18a of the supporting body 18. The bottom face of the substrate 15C was then adhered obtain the optical modulator 1E.

The S21 property measured was the same as example 1. A ripple was not observed within a frequency range measured.

(Comparative Example 1)

An optical waveguide substrate 15A was produced according to the same process as the example 1. A main body 2 for an optical modulator was adhered and fixed onto the opposing face 8a of the plate-shaped supporting body 8 using a film-shaped resin with a thickness of 100 μm, without forming a conductive layer on the opposing face 8a. An optical modulator was thus produced.

The connecting faces (end faces) of the optical waveguides to an outer optical fiber were polished. The resulting wafer was then cut with a dicing machine to obtain chips. Each chip had a width of 4.4 μm and a total thickness of 1 mm.

The S21 property measured was the same as example 1. The results are shown in FIG. 8 as broken lines. A ripple was observed at a frequency of about 25 GHz, indicating the deterioration of the frequency characteristics.

(Example 6)

An optical modulator shown in FIGS. 11 to 14 was produced.

That is, an optical waveguide substrate 12 was produced as described in the example 2. A conductive layer 31A (thickness of 1 μm) was formed on the opposing face of the supporting body 18 in a region R2 right under the connecting part to an outer connector. The shape of the conductive layer 31A was rectangular. The length of the layer 31A was not shorter than "W+2G". The layer 31A also covers a region R2 right under the feedthrough gap 33 between the end part 30a of the signal electrode 30 and the side face 12f of the main body 12. For example, the length of the conductive layer 31A was 580 μm and width was 150 μm, provided that G=40 μm and W=500 μm. Au was provided in the input and output regions of the electrodes of coplanar pattern.

The main body 12 and supporting body 18 were adhered and fixed with each other to obtain an optical modulator 1G. A film-shaped epoxy resin with a thickness of 100 μm was used as the resin 6B for the adhesion. The connecting faces (end faces) to other optical fibers of the optical waveguide 4C were polished. The resulting wafer was then cut with a dicing machine to obtain chips. Each chip had a width of 4.4 μm and a total thickness of 1 mm.

A coaxial pin of glass beads for a V-connector was directly connected with the signal electrode. The ground electrodes were conducted with a package. The S21 property of the mounted optical modulator was measured using a vector network analyzer. A ripple was not generally observed within a frequency range subjected for the measurement. However, a ripple may occasionally be observed in the S21 property. It is thought that such a ripple may be induced by the resonance of the substrate due to substrate radiation from mismatched portions of impedance in the optical waveguides. The mismatched portions may be caused by curved parts of coplanar lines, deviations of line widths of the electrode lines and deviations of gaps between the adjacent electrodes.

(Example 7)

An optical modulator 1H shown in FIGS. 15 and 16 was produced. That is, the optical waveguides substrate 12 was produced as described in the example 2. A conductive layer 7B (thickness of 1 μm) of gold was formed on the opposing face 18a of the plate-shaped supporting body 18. The main body 12 for an optical modulator was then adhered and fixed onto the opposing face 18a to provide optical modulator 1H. A film-shaped epoxy resin with a thickness of 100 μm was used as the resin 6B for the adhesion. The connecting faces (end faces) of the optical waveguide 4C were polished. The resulting wafer was then cut with a dicing machine to obtain chips. Each chip had a width of 4.4 μm and a total thickness of 1 mm.

Carbon paste was applied onto both side faces of the main body 12, resin 6B and supporting body 18 to form side conductive layers 36A and 36B. Carbon paste was also applied onto the bottom face 18b of the supporting body 18 to form a conductive connecting portion 35.

A coaxial pin of glass beads for a V-connector was directly connected with the signal electrode. The ground electrodes were conducted with a package. The S21 property of the mounted optical modulator was measured using a vector network analyzer. A ripple was not generally observed within the frequency range measured. In this case, the incidence of a ripple was further reduced by the conduction of the side conductive layers 36A and 36B on the side faces of the main and supporting bodies.

As described above, the present invention provides a novel optical waveguide device having an optical waveguide substrate and a supporting body for the substrate, in which the resonance due to the substrate radiation leakage into the whole of the waveguide substrate and supporting body may be reduced.

The present invention has been explained referring to the preferred embodiments, however, the present invention is not limited to the illustrated embodiments which are given by way of examples only, and may be carried out in various modes without departing from the scope of the invention.

The invention claim is:

1. An optical waveguide device comprising an optical waveguide substrate and a supporting body for supporting said optical waveguide substrate;
   wherein said optical waveguide substrate comprises a main body made of an electro-optic material, an optical waveguide and an electrode for applying an electrical signal on said optical waveguide, and said supporting body has an upper opposing face opposing a bottom face of said main body, said device further comprising a conductive layer under said main body which covers at least a part of said opposing face;
   wherein a space is formed in at least one of said optical waveguide substrate and said supporting body, and wherein said conductive layer covers said supporting body under said space.

2. The device of claim 1, comprising a joining layer between said optical waveguide substrate and said conductive layer.

3. The device of claim 1, wherein said optical waveguide substrate and said supporting body are joined with said conductive layer.

4. The device of claim 1, wherein said main body of said optical waveguide substrate has a maximum thickness of not larger than 200 μm.

5. The device of claim 1, wherein said main body has a bottom face opposing said supporting body and said space is formed on the side of said bottom face.

6. The device of claim 1, wherein said space is formed in said supporting body.

7. The device of claim 6, wherein a low dielectric material having a dielectric constant lower than that of said electro-optic material is filled in at least a part of said space.

8. The device of claim 1 comprising of feedthrough portion for connecting said electrode with an outer terminal, wherein said conductive layer covers at least a part of a region of said opposing face under said feedthrough portion.

9. The device of claim 8, wherein said main body has a main face, said bottom face and side faces, said electrode comprises a signal electrode and ground electrode on said main face, said signal electrode has an end portion near one of said side faces, an electrode gap is formed between said signal electrode and said ground electrode, and a feedthrough gap is formed between said end portion and said side face and between said electrode gap and said side face, said conductive layer covering at least a region of said opposing face under said feedthrough gap.

10. The device of claim 8, wherein said main body has a main face, bottom face and a pair of side faces and said device further comprises side conductive layers formed on said side faces, respectively, said side conductive layers being electrically connected with each other.

11. The device of claim 1, wherein said main body has a main face, a bottom face and a pair of side faces and said device further comprises side conductive layers formed on said side faces, respectively, said side conductive layers being electrically connected with each other.

12. The device of claim 1, wherein a low dielectric material is filled in said space.

13. A supporting member for supporting an optical waveguide device, said device comprising a main body made of an electro-optic material, an optical waveguide, and an electrode for applying an electrical signal on said optical waveguide;
   wherein said supporting member comprises a supporting body having an upper opposing face opposing a bottom face of said main body, and a conductive layer under said main body and covering at least a part of said opposing face; and
   wherein a space is formed in at least one of said main body and said supporting body, and wherein said conductive layer covers said supporting body under said space.

14. The supporting member of claim 13, further comprising a joining layer on said conductive layer.

15. The supporting member of claim 13, wherein said conductive layer functions as a joining layer for joining said main body and said supporting body.

16. The supporting member of claim 13, wherein said space is formed in said supporting body.

17. The supporting member of claim 16, wherein a low dielectric material having a dielectric constant lower than that of said electro-optic material is filled in at least a part of said space.

18. The supporting member of claim 13, wherein said optical waveguide substrate comprises a feedthrough portion for connecting said electrode with an outer terminal, and said conductive layer covers at least a part of a region of said opposing face under said feedthrough portion.

19. The supporting member of claim 18, wherein said main body has a main face, bottom face and side faces, said electrode comprises a signal electrode and ground electrode on said main face, said signal electrode has an end portion near one of said side faces, an electrode gap is formed between said signal electrode and said ground electrode, and a feedthrough gap is formed between said end portion and said side face and between said electrode gap and said side face, said conductive layer covering at least a region of said opposing face under said feedthrough gap.

20. The supporting member of claim 13, wherein said supporting body has a pair of side faces and said member further comprises side conductive layers formed on said side faces, respectively, said side conductive layers being electrically connected with each other.

21. The device of claim 13, wherein a low dielectric material is filled in said space.

22. An optical waveguide device comprising an optical waveguide substrate and a supporting body for supporting said optical waveguide substrate;
   wherein said optical waveguide substrate comprises a main body made of an electro-optic material, an optical waveguide and an electrode for applying an electrical signal on said optical waveguide, said supporting body has an upper opposing face opposing a bottom face of said main body, and wherein said device further comprises a conductive layer provided under said main body of said optical waveguide substrate and covering at least a part of said opposing face, and a joining layer comprising an adhesive having a dielectric constant lower than that of said electro-optic material is provided between said conductive layer and said main body.

23. The device of claim 22, wherein said main body of said optical waveguide substrate has a maximum thickness of not larger than 200 μm.

24. The device of claim 22, wherein said main body has a bottom face opposing said supporting body and a space is formed on the side of said bottom face.

25. The device of claim 22, wherein a space is formed in said supporting body.

26. The device of claim 25, wherein a low dielectric material having a dielectric constant lower than that of said electro-optic material is filled in at least a part of said space.

27. The device of claim 22 comprising a feedthrough portion for connecting said electrode with an outer terminal, wherein said conductive layer covers at least a part of the region of said opposing face under said feedthrough portion.

28. The device of claim 27, wherein said main body has a main face, said bottom face and side faces, said electrode comprises a signal electrode and ground electrode on said main face, said signal electrode has an end portion near one of said side faces, an electrode gap is formed between said signal electrode and said ground electrode, and a feedthrough gap is formed between said end portion and said side face and between said electrode gap and said side face, said conductive layer covering at least a region of said opposing face under said feedthrough gap.

29. The device of claim 27, wherein said main body has a main face, said bottom face and a pair of side faces and said device further comprises side conductive layers formed on said side faces, respectively, said side conductive layers being electrically connected with each other.

30. The device of claim 22, wherein said main body has a main face, said bottom face and a pair of side faces, and said device further comprises side conductive layers formed on said side faces, respectively, said side conductive layers being electrically connected with each other.

31. A supporting member for supporting an optical waveguide device, said device comprising a main body made of an electro-optic material, an optical waveguide, and an electrode for applying an electrical signal on said optical waveguide;
wherein said supporting member comprises a supporting body having an upper opposing face opposing a bottom face of said main body, a conductive layer provided under said main body and covering at least a part of said opposing face, and a joining layer comprising an adhesive having a dielectric constant lower than that of said electro-optic material between said conductive layer and said main body.

32. The supporting member of claim 31, wherein a space is formed in said supporting body.

33. The supporting member of claim 32, wherein a low dielectric material having a dielectric constant lower than that of said electro-optic material is filled in at least a part of said space.

34. The supporting member of claim 31, wherein said optical waveguide substrate comprises a feedthrough portion for connecting said electrode with an outer terminal, and said conductive layer covers at least a part of the region of said opposing face under said feedthrough portion.

35. The supporting member of claim 34, wherein said main body has a main face, said bottom face and side faces, said electrode comprises a signal electrode and ground electrode on said main face, said signal electrode has an end portion near one of said side faces, an electrode gap is formed between said signal electrode and said ground electrode, and a feedthrough gap is formed between said end portion and said side face and between said electrode gap and said side face, said conductive layer covering at least a region of said opposing face under said feedthrough gap.

36. The supporting member of claim 31, wherein said supporting body has a pair of said faces and said member further comprises side conductive layers formed on said faces, respectively, said side conductive layers being electrically connected with each other.

* * * * *

UNITED STATES PATENT AND TRADEMARK OFFICE
CERTIFICATE OF CORRECTION

| | | |
|---|---|---|
| PATENT NO. | : 7,068,863 B2 | Page 1 of 1 |
| APPLICATION NO. | : 10/233929 | |
| DATED | : June 27, 2006 | |
| INVENTOR(S) | : Jungo Kondo et al. | |

It is certified that error appears in the above-identified patent and that said Letters Patent is hereby corrected as shown below:

Column 7

*Line 45*: please delete "a"

Column 13
   *Line 55*: please add --said-- before "bottom"
   *Line 60*: please change the first occurrence of "a" to --said--

Column 16
   *Line 29*: please change first occurrence of "said" to --side--

Signed and Sealed this

Thirty-first Day of October, 2006

JON W. DUDAS
*Director of the United States Patent and Trademark Office*